United States Patent Office 2,729,579
Patented Jan. 3, 1956

2,729,579
METHOD OF TREATING A FIBROUS COOKING UTENSIL

George E. Rhone, Long Beach, Calif.

No Drawing. Application July 16, 1953,
Serial No. 368,529

3 Claims. (Cl. 117—143)

This invention relates to a method of treating a cellulose fibrous utensil, such as a pie or cake pan, and in which pies, cakes, fish, meats, etc., may be cooked and served all in the same utensil. My method of treating the cellulose fiber cooking utensil renders the utensil heat resistant to the extent that the utensil may be placed in an oven and various foods may be directly cooked therein.

The utensil, produced in accordance with my invention, is inexpensive and serviceable and may be discarded after a single use, if desired. The utensil, produced in accordance with my invention, may be formed of any desirable cellulose fibrous material, this material being preferably pressed in a die to the shape required for its particular use as a cooking and serving utensil.

The utensil, produced according to my invention, will withstand the high temperatures required to cook or bake certain foods, and will also have the necessary strength and rigidity to meet the mechanical requirements of modern baking processes. The utensil, formed of a cellulose fiber, has a certain porosity so that it will absorb and retain certain chemicals, and also being porous will more readily transmit heat so that the food product contained therein will cook or bake more rapidly.

To illustrate a complete and satisfactory procedure and process for the production of a cooking utensil in accordance with my invention, a cellulose fibrous material is impregnated with a substance compounded as follows:

| | Parts |
|---|---|
| Ammonium sulphate | 3 |
| Borax | 1 |
| Calcium carbonate | 2 |
| Ferric oxide | 1 |
| Aluminum silicate | 1 |
| (40° Bé) sodium silicate | 10 |
| Water | 5 |

The parts herein designated are preferably by volume. The ingredients specified above are thoroughly mixed and are then allowed to stand quiescent for eight hours. The cellulose fibrous pulp material is then impregnated with the above liquid by immersing the material for twenty minutes, more or less. The utensil may have been previously formed into the desired shape, or it may be subsequently shaped after immersion, if desired. After the utensils have been immersed twenty minutes, more or less, as specified above, they are allowed to drain and are then oven dried at a temperature of 125° Fahrenheit. After the utensils have been treated as specified above, they are then immersed in a saturated solution of calcium chloride or aluminum chloride for five minutes, are then allowed to drain and are then oven dried at a temperature of 125° Fahrenheit.

The last step in the treating method or process, namely, that of immersing the utensil in a metallic chloride, serves the purpose of setting the action of the immersion in the first solution above described. There is a chemical reaction between the metallic chloride and certain chemicals of the first described solution, namely, the metallic silicates. After the steps, as described above, the cellulose fiber utensil is quite rigid. It will carry a considerable weight without distorting or deforming, and it will take the required heat to cook the food in the utensil, for example, a temperature of around 400° Fahrenheit.

Having described my invention, I claim:

1. The method of treating a cooking utensil formed of a cellulose fiber which consists in first immersing the cellulose fiber utensil in a solution, consisting of ammonium sulphate 3 parts by volume, borax 1 part by volume, calcium carbonate 2 parts by volume, ferric oxide 1 part by volume, aluminum silicate 1 part by volume, sodium silicate 10 parts by volume and water 5 parts by volume, then drying the utensil at 125° Fahrenheit, then immersing the utensil in a solution of calcium chloride, and then drying the utensil at a temperature of 125° Fahrenheit.

2. The method of treating a cooking utensil formed of a cellulose fiber which consists in first immersing the utensil in a solution, consisting of ammonium sulphate 3 parts by volume, borax 1 part by volume, calcium carbonate 2 parts by volume, ferric oxide 1 part by volume, aluminum silicate 1 part by volume, sodium silicate 10 parts by volume and water 5 parts by volume, then drying the utensil, then immersing the utensil in a saturated solution of calcium chloride, and then again drying the utensil.

3. The method of treating a cooking utensil formed of a cellulose fiber which consists in first immersing the cooking utensil for twenty minutes in a solution, consisting of ammonium sulphate 3 parts by volume, borax 1 part by volume, calcium carbonate 2 parts by volume, ferric oxide 1 part by volume, aluminum silicate 1 part by volume, sodium silicate 10 parts by volume and water 5 parts by volume, then oven drying the utensils at a temperature of 125° Fahrenheit, then immersing the utensils in a saturated solution of calcium chloride for five minutes, then oven drying the utensils at a temperature of 125° Fahrenheit.

No references cited.